SPINDLE FOR SELECTIVELY ACCOMMODATING REELS
HAVING DIFFERENT SIZE OPENINGS
Filed Oct. 26, 1967

JOHN J. BUNDSCHUH
VICTOR J. WITKOWSKI
INVENTORS
BY Glen W. Grembau
Robert W Hampton
ATTORNEYS 3,502,279
Patented Mar. 24, 1970

3,502,279

SPINDLE FOR SELECTIVELY ACCOMMODATING REELS HAVING DIFFERENT SIZE OPENINGS

John J. Bundschuh and Victor J. Witkowski, Rochester, N.Y., assignors to Eastman Kodak Company, Rochester, N.Y., a corporation of New Jersey Filed Oct. 26, 1967, Ser. No. 678,304
Int. Cl. B65h *17/02*
U.S. Cl. 242—68.3 9 Claims

ABSTRACT OF THE DISCLOSURE

A spindle is disclosed having a reel supporting post, and a reel supporting adapter sleeve slidably mounted on the post and movable between an operative position, in which the sleeve supports and drives a reel having a center opening of one size, and an inoperative position, in which the sleeve is disabled and the post supports and drives a reel having a center opening of a different size.

BACKGROUND OF THE INVENTION

This invention relates generally to spindles, and more specifically to an improved spindle for selectively supporting and driving reels having center openings of different sizes.

Spindles for supporting and driving reels are well known in the art. Normally, such spindles are designed to accommodate a reel having a center opening of a predetermined size and configuration. In order to accommodate a reel having a center opening of a larger size, it is necessary to provide a detachable sleeve for the spindle to accommodate the new reel. Although sleeves of this type way work satisfactorily, they suffer the disadvantage of being easily misplaced, or lost, and further necessitate the use of tools for properly mounting the sleeve on the spindle.

At present, in the moving picture projector art, there are projectors on the market that will only project regular 8 film, and others that will only project super 8 film. In order to prevent a customer from attempting to project regular film on a super 8 film projector, or vice versa, and hence ruining the film, the regular 8 and super 8 film reels are provided with center openings of different sizes. However, there are times when it is desirable to have a spindle on an apparatus capable of accommodating both reels, such as a combination projector or universal editor which is designed to handle both types of film. This invention involves a spindle which can easily and readily accommodate both types of reels.

One of the objects of this invention is to provide an improved spindle for supporting and driving reels having center openings of different sizes.

Another object of the invention is to provide an improved spindle having an adapter sleeve to enable the spindle to support and drive reels having center openings of different sizes, and in which the adapter is an integral part of the spindle.

Another object of the invention is to provide an improved spindle for supporting and driving reels having center openings of different sizes, and in which the spindle is of simple design and construction, thoroughly reliable and efficient in operation, and economical to manufacture.

SUMMARY OF THE INVENTION

To attain these objects, applicant's invention includes within its scope a spindle having a reel supporting post, and a reel supporting adapter sleeve slidably mounted on the post. The sleeve is movable between an operative position, in which the post is disabled and the sleeve supports a reel having a center opening of one size, and an inoperative position, in which the sleeve is disabled and the post supports a reel having a center opening of a different size. In the operative position, the post provides the driving element for the reel, and in the inoperative position, the sleeve provides the driving element for the reel.

Objects and advantages other than those set forth above will be apparent from the following description when read in connection with the accompanying drawing.

DESCRIPTION OF PREFERRED EMBODIMENT

Figures 1, 2, 3, 4:
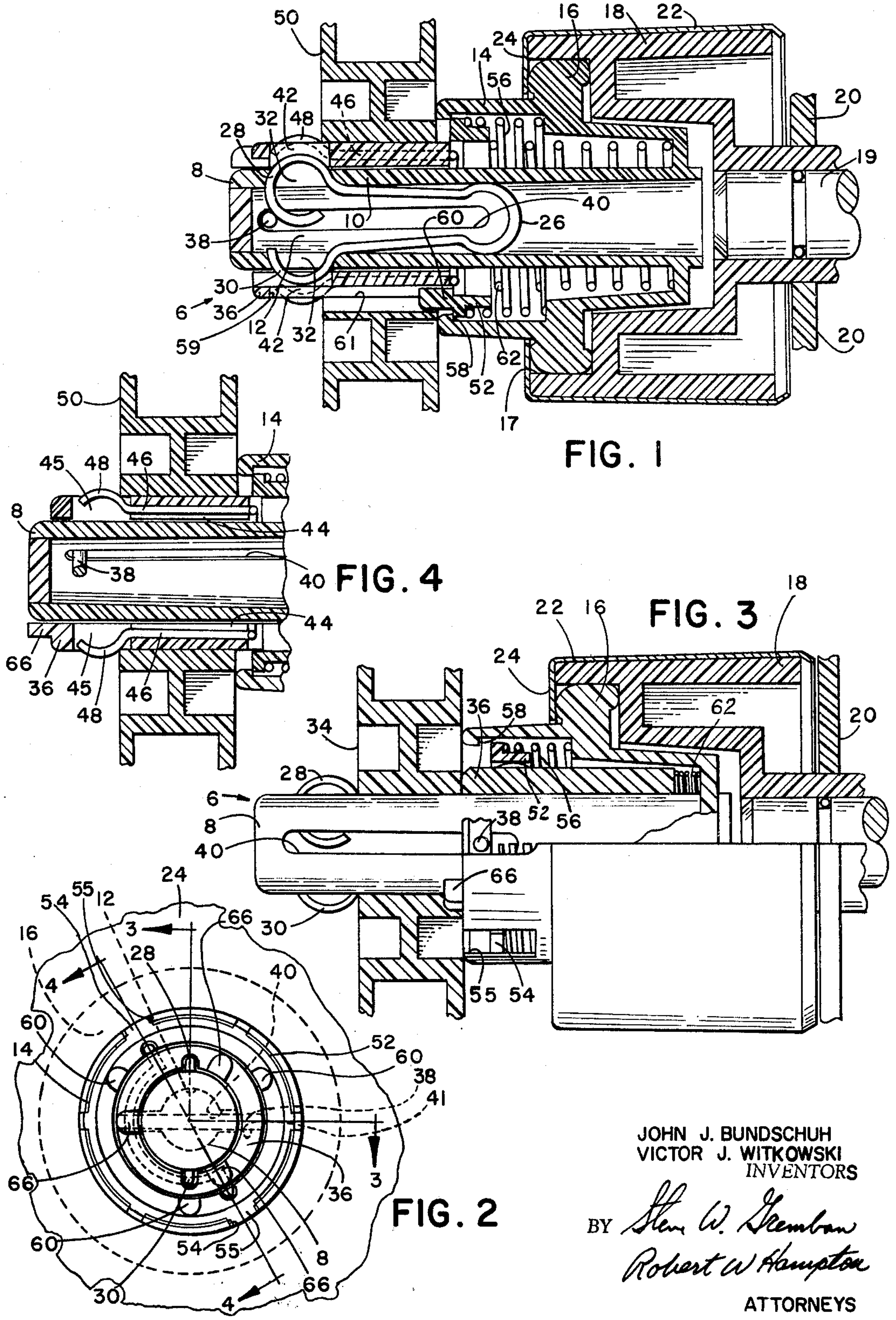
FIG. 1 is a side elevation view in section of a spindle showing an adapter sleeve in its operative position for supporting and driving a reel having a center opening of one size.
FIG. 2 is a segmental end view of the spindle of FIG. 1.
FIG. 3 is a side elevation view similar to FIG. 1 taken along line 3—3 of FIG. 2 and showing the adapter sleeve in its inoperative position, and a post supporting and driving a reel having a center opening of a different size.
FIG. 4 is a section view of a segment of FIG. 2 taken along line 4—4 of FIG. 2.

Referring to the drawing, a spindle 6 is disclosed having a reel supporting cylindrical post 8 of which the outer wall 10 thereof defines a cavity 12. Integrally formed with wall 10 at the inner end of post 8 is an annular, cup-shaped housing 14. The housing 14 has a radially extending peripheral rim 16 which is rotatably supported within a bore 17 of a drive member 18 secured by any suitable means to a drive shaft 19 and mounted for rotation within fixed bearing supports 20. The housing 14 may be clutched to drive member 18 by any suitable clutch mechanism shown as a spring 22 mounted on the periphery of drive member 18 and having one or a plurality of spring lips 24 in frictional engagement with rim 16 for driving spindle 6 at some predetermined torque determined by the spring force of lip 24.

A generally U-shaped wire spring 26 is interposed in cavity 12 of post 8, and has curved spring ends 28, 30 extending partially through diametrically opposed slots 32 in wall 10 to provide spring detents for releasably holding a reel 34 having a center opening of one diameter on post 8 as best seen in FIG. 3. The reel 34 is interposed between an end of housing 14, which engages one of the reel flanges, and detents 28, 30 which engage the inner periphery of the other reel flange.

A reel supporting adapter sleeve 36 is slidably mounted on post 8, and is movable thereon between an operative position as seen in FIG. 1 and an inoperative position as seen in FIG. 3. The sleeve 36 is retained on post 8 for non-rotation by a pin 38 extending through diametrically opposed slots 40 in wall 10. The ends of pin 38 extend in press fit relation into diametrically opposed openings 41 in sleeve 36 as best seen in FIG. 2. The sleeve 36 may be releasably held in its operative position as seen in FIG. 1 by detents 28, 30 which extend into complementary, diametrically opposed slots 42 in sleeve 36. Also, pin 38 may cooperate with a portion of curved end 28 extending into cavity 12 to form a detent system for releasably holding sleeve 36 in its operative position. Either or both of these detent systems may be used as desired. In this operative position of sleeve 36, post 8 is disabled or incapable of supporting a reel. The sleeve 36 further has diametrically opposed grooves 44 which extend along the inner periphery of sleeve 36 and merge with diametrically opposed slots 45 extending through the walls of sleeve 36 for supporting springs 46. The curved ends 48 of springs 46 extend partially through slots 42 to form detents which in the operative position of sleeve 36 releasably hold a reel 50 having a center opening of greater size than the center opening in reel 34. As seen in FIG. 1, the flanges of reel 50 are interposed between the end of housing 14 and curved spring 48.

A drive system for reel 50 comprises drive teeth 60 (see FIGS. 1 and 2) on an annular drive element 52 slidably mounted within the bore of housing 14. The drive element 52 is drivingly connected to housing 14 by radial lugs 54 extending into axial notches 55 in housing 14 as best seen in FIGS. 2 and 3. A helical spring 56 urges drive element 52 against an annular rib surface 58 of housing 14. In this position, the angularly spaced drive teeth 60 on drive element 52 are engageable with complementary drive slots along the inner periphery of the center opening in reel 50. Teeth 60 further have a radially inwardly extending portion extending into and slidable along axially extending peripheral grooves 61 in sleeve 36 as best seen in FIG. 1. A helical spring 62 is interposed between the closed end of housing 14 and one end of sleeve 36, and when a reel 34 is mounted on post 8, sleeve 36 is moved into its inoperative position as seen in FIG. 3. This movement of sleeve 36 compresses spring 62 preloading it so that it urges sleeve 36 and angularly spaced drive teeth 66 on the opposite end thereof into engagement with complementary drive slots along the inner periphery of the center opening of reel 34. Also, during movement of sleeve 36 to its inoperative position, the ends or shoulders 59 of grooves 61 engage teeth 60 and urge drive element 52 axially inwardly withdrawing teeth 60 so that they do not interfere with the flange of reel 34 which in its mounted position abuts the end of housing 14.

The invention has been described in detail with particular reference to one embodiment thereof, but it will be understood that variations and modifications can be effected within the spirit and scope of the invention as described hereinabove, and as defined in the appended claims.

We claim:

1. In an adjustable spindle for selectively and rotatably supporting reels having center openings of two different sizes, the combination comprising:

first means for rotatably supporting a first reel having a center opening of one size, said first means being elongate and defining a longtiudinal axis;

second means mounted on said first means for rotatably supporting a second reel having a center opening of a larger size;

said second means being movable on said first means between an operative position, in which said second means is in position to rotatably support the second reel, and an inoperative position in which said first means is exposed to rotatably support the first reel; and, latching means on said first means for releasably latching said second means in the operative position of said second means, said latching means comprising a detent engageable with said second means to securely latch said second means aaginst axial movement in either direction on said first means.

2. The invention according to claim 1 wherein said first means comprises a post for supporting the first reel, and said second means comprises a sleeve slidably mounted on said post for supporting the second reel.

3. The invention according to claim 1 wherein said first means comprises a post and a detent supported by said post for holding the first reel on said post, and said second means comprises a sleeve slidably mounted on said post, said detent further releasably holding said sleeve when said second means is in its operative position.

4. The invention according to claim 3 wherein said post defines a bore, and said detent comprises a spring mounted within said bore cooperating with a pin carried by said sleeve.

5. The invention according to claim 3 wherein said post has an annular wall defining a cavity and further has first and second diametrically opposed slots extending through said wall, and said sleeve supports a pin extending through said first and second slots and said cavity, and said detent is mounted within said cavity and comprises a wire spring having a bent end, one portion of which extends through one of said first and second slots for releasably holding said first reel on said post, and another portion of which extends into said cavity to cooperate with said pin for releasably holding said sleeve.

6. The invention according to claim 3 wherein said first means further comprises a first drive member for driving the first reel, and said second means comprises a second drive member encircling said sleeve for driving the second reel.

7. The invention according to claim 6 wherein said first drive member comprises drive teeth on said sleeve and a spring for biasing said teeth into driving engagement with the first reel when mounted on said post, and said second drive member comprises an annular drive element encircling said sleeve, and a spring for biasing said drive element into driving engagement with the second reel when mounted on said sleeve.

8. The invention according to claim 1 wherein said first means comprises a post and a detent supported by said post for holding the first reel on said post, said second means comprises a sleeve slidably mounted on said post, said detent releasably holding said sleeve when said second means is in its operative position, said first means further comprising drive teeth on the end of said sleeve and a first spring for biasing said teeth into driving engagement with the first reel when mounted on said post, and a second drive member comprising an annular drive element encircling said sleeve and a second spring for biasing said drive element into driving engagement with said second reel when mounted on said sleeve, said drive element having radial portions extending into axially extending peripheral grooves in said sleeve, said grooves terminating in shoulders adapted to engage said drive element and to move said element out of the way of the first reel when mounted on said post.

9. A motion picture projector comprising:

a spindle housing memer; and an adjustable spindle for selectively supporting and driving reels having means defining center openings of two different sizes, the spindle including:

first means for supporting and driving a first reel having means defining a center opening of one size;

second means mounted on said first means for supporting and driving a second reel having means defining center opening of a larger size;

said second means being movable on said first means between an operative position, in which said second means is in position to support and drive the second reel, and an inoperative position in which said first means is exposed to support and drive the first reel, said first and second means each supporting their respective reels against the spindle housing for limiting axial movement of each reel on the spindle; and, latching means on said first means for releasably latching said second means in its operative position.

References Cited

UNITED STATES PATENTS 3,326,489 6/1967 Lessler ---------- 242—68.3

NATHAN L. MINTZ, Primary Examiner